(12) United States Patent
Cortright et al.

(10) Patent No.: US 6,272,275 B1
(45) Date of Patent: Aug. 7, 2001

(54) PRINT-MOLDING FOR PROCESS FOR PLANAR WAVEGUIDES

(75) Inventors: Jeffrey E. Cortright; Martha B. Custer, both of Corning, NY (US); Ronald E. Johnson, Tioga, PA (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/337,026

(22) Filed: Jun. 25, 1999

(51) Int. Cl.$^7$ .................................................. G02B 6/10
(52) U.S. Cl. ........................ 385/129; 385/131; 385/132; 264/1.24; 264/1.29
(58) Field of Search ............................ 385/49, 131, 132, 385/147, 129; 264/1.24, 1.29

(56) References Cited

U.S. PATENT DOCUMENTS

| | | |
|---|---|---|
| 4,661,212 | 4/1987 | Ehrfeld et al. . |
| 4,694,548 | 9/1987 | Ehrfeld et al. . |
| 4,702,792 | 10/1987 | Chow et al. . |
| 4,944,836 | 7/1990 | Beyer et al. . |
| 5,260,175 | 11/1993 | Kowanz et al. . |
| 5,514,503 | 5/1996 | Evans et al. . |
| 5,533,447 | 7/1996 | Johnson et al. . |
| 5,535,673 | 7/1996 | Bocko et al. . |
| 5,540,147 | 7/1996 | Johnson . |
| 5,544,582 | 8/1996 | Bocko et al. . |
| 5,624,775 | 4/1997 | Carre et al. . |
| 5,657,338 * | 8/1997 | Kitamura ............................ 385/131 |
| 5,678,483 | 10/1997 | Johnson . |
| 5,701,815 | 12/1997 | Bocko et al. . |
| 5,752,442 | 5/1998 | Johnson et al. . |
| 5,853,446 | 12/1998 | Carre et al. . |
| 6,044,098 * | 3/2000 | Sun ...................................... 385/131 |

FOREIGN PATENT DOCUMENTS

| | | |
|---|---|---|
| WO 9509726 | 4/1995 | (WO) . |
| WO 9635971 | 11/1996 | (WO) . |
| WO 9821626 | 5/1998 | (WO) . |

\* cited by examiner

*Primary Examiner*—Hung N. Ngo
(74) *Attorney, Agent, or Firm*—Price, Heneveld, Cooper, DeWitt & Litton

(57) ABSTRACT

A method for fabricating optical devices for transmission and/or manipulation of light includes steps of providing a substrate which defines a reference plane for positioning cladding material and core material, fixing rigid spacers to an upper surface of the substrate, the spacers having upper surfaces which define a second plane spaced above the reference plane, depositing a layer of a formable, curable under-cladding material over the upper surface of the substrate, the upper surface of the rigid spacers providing a guide for precise control of the height of the under-cladding material above the surface of the substrate, curing the under-cladding material under compression to form an under-cladding layer, and depositing a light guide core and over-cladding on the under-cladding. The method is susceptible to mass production and provides more precise control of the position of the light guide core relative to a substrate surface. The resulting optical device includes a substrate, a pattern of rigid spacers fixed to the upper surface of the substrate, a polymeric under-cladding layer positioned on the substrate and in space defined between the rigid spacers, a polymer light guide core positioned on the under-cladding layer, and a polymeric over-cladding layer positioned over the light guide core and at least a portion of the under-cladding.

18 Claims, 7 Drawing Sheets

PRINT-MOLDING FOR PROCESS FOR PLANAR WAVEGUIDES

BACKGROUND OF THE INVENTION

1. Field of the Invention

This invention relates to the field of fabricating optical devices, and, more particularly, to the field of fabricating optical devices including a planar light guide defined by two or more polymers with different refractive indices.

2. Technical Background

Optical components may be used to transmit and process light signals in various fields of technology, such as telecommunications, data communications, avionic control systems, sensor networks, and automotive control systems. Generally, such optical components are classed as either passive or active. Examples of passive optical components are those which provide polarization control, transmission, distribution, splitting, combining, multiplexing, and demultiplexing of the light signal. Active optical components include those requiring electrical connections to power and/or control circuitry, such as laser sources and photodiode detectors, and/or to process light signals using electro-optic effects, such as provided by certain non-linear optical materials. It is known to use inorganic materials, such as glass and other materials comprised of silica, to produce optical components. The methods of manufacture of such inorganic optical components are based primarily on lithographic technologies used in the mass production of semiconductor wafers. However, the subsequent connecting of optical fibers to such components is complex, and requires the use of active alignment techniques which become increasingly more difficult as the complexity of the components increase. Thus, the manufacture of complex optical components from inorganic materials is relatively difficult and expensive.

Organic optical components comprising polymeric materials are known using direct and indirect lithographic processes. In indirect lithographic processes, a master pattern is formed from an organic or inorganic resist material. The master pattern is then replicated by electro-deposition to provide a series of molds which are then filled with a suitable polymeric material to produce the organic passive optical components.

Organic optical components usually comprise two or more polymers having different refractive indices. The polymer having the higher refractive index when surrounded by the other polymer can function as a waveguide for the transmission and/or processing of a light signal. The higher refractive index polymer is usually introduced into the other polymer as a resin which is then cured. A higher refractive index polymer must be introduced in a precise and controlled manner in order to reduce optical loss from the resulting waveguide. Known processes used in the preparation of such waveguides lead to the formation of a relatively thick and uneven residual layer of resin in the organic optical component which when cured results in a relatively thick layer of polymer of variable thickness. This gives rise to problems such as unexceptably high optical losses, non-uniform output, and inconsistent performance, thereby reducing the incentive to use such organic optical components.

A method of preparing an organic optical component having improved characteristics, and which is intended to facilitate mass production, involves forming a first layer of an optically transmissive first polymer, forming a retaining feature or groove pattern in the first layer, forming a line of contact between a flexible dispensing layer and the surface of the first layer and progressively contacting the surface with the flexible dispensing layer such that the line of contact advances across the surface. A sufficient amount of a curable second polymer is then applied to substantially fill the retaining feature along the line of contact and cured. Sufficient pressure is applied along the line of contact such that substantially all of the resin which is surplus to that required to fill the retaining feature at the line of contact passes with the advancing line of contact thereby filling the retaining feature with resin. The resin filling the retaining feature may be cured as it passes the line of contact. Although this method may provide some improvement in precise positioning and control over the thickness of the waveguide core material than other known processes for preparing optical devices from polymeric materials, there remains a need for improved processes which provide greater precision and control in positioning of polymeric waveguide core material in an optical device.

SUMMARY OF THE INVENTION

The present invention provides improved methods for fabricating optical devices for transmission and/or manipulation of light, and to the resulting optical devices. The method involves depositing a rigid spacer pattern on a substrate to provide a guide for precise control of the position of an under-cladding layer and light guide core relative to the substrate surface.

The method includes the steps of: providing a substrate which defines a reference plane for positioning cladding material and core material; and affixing spacers to an upper surface of the substrate, the spacers having upper surfaces which define a second plane spaced above the reference plane. The method also includes depositing a layer of a formable, curable under-cladding material over the upper surface of the substrate with the upper surface of the rigid spacers providing a guide for precise control of the position and configuration of the under-cladding material. A light guide core and over-cladding is deposited onto the under-cladding layer. The core has an index of refraction greater than the over-cladding and the under-cladding, with the core being positioned between the cladding layers.

The resulting optical device includes a substrate, a pattern of rigid spacers fixed to the upper surface of the substrate, a polymeric under-cladding layer deposited on the substrate between the rigid spacers, a polymeric light guide core deposited on the under-cladding layer, and a polymeric over-cladding layer deposited over the light guide core and over at least a portion of the under-cladding.

DESCRIPTION OF THE PREFERRED EMBODIMENTS

The invention relates to methods and apparatuses for fabricating organic (polymeric) optical devices in which micro-print molding techniques are employed to precisely control the positioning and dimensions of a light guide core and the surrounding cladding. The methods involve first forming a spacer or rib pattern on a substrate. The rib pattern precisely defines and controls the shape and thickness of a subsequently applied under-cladding layer. By precisely controlling the configuration of the under-cladding on the substrate, it becomes possible to subsequently precisely control the position and configuration of the core which is formed on the under-cladding. The device is completed by forming an over-cladding which encases the core within the cladding layer. The processes and resulting optical devices are now described in more detail with reference to the drawings.

Figure 1:
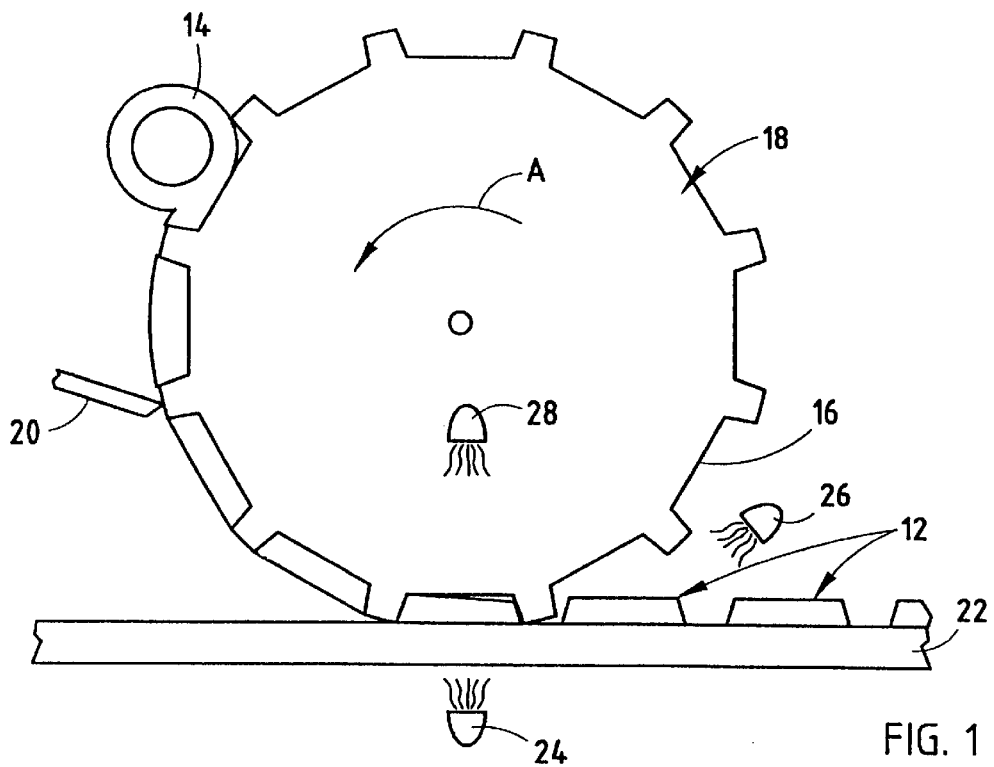
FIG. 1 is a schematic side elevational view illustrating the apparatus and method for deposition of rigid spacer ribs for precise deposition of an under-cladding material on an upper surface of a substrate for an optical device.

FIG. 1 illustrates an initial step of depositing rigid spacer ribs 12 to an upper surface of a substrate 22 for optical devices such as a splitter, a coupler or any other device employing light guides. A pattern of rigid ribs 12 of uniform thickness is fixed to the upper surface of the substrate to enable a cladding layer of material to effectively bond to the substrate. The ribs are affixed to substrate 22 by compressing a curable polymer composition between the substrate and a release surface having a relief pattern which defines the pattern of ribs, and curing the curable polymer composition under compression. The curable polymer composition for ribs 12 preferable is deposited from an applicator roll 14 onto recessed surface 16 of an intaglio roll 18. Alternatively, curable polymeric material could be doctored into recesses or grooves 16. Recessed pattern 16 corresponds to a desired rib pattern for the optical device. After deposition of curable polymeric material into recess pattern 16, excess polymeric material for ribs 12 is removed from the recesses by doctor blade 20.

Curable polymer composition 12 should preferably develop sufficient cohesiveness while retained within the recess pattern 16 to retain the shape of the recess pattern 16. Preferably, to facilitate this result, curable polymer composition 12 may be hardened during deposition to the substrate 22. For example, curable polymer composition 12 may be cured by directing UV radiation at the polymer composition simultaneous with deposition of the polymer composition to substrate 22. Substrate 22 may be transparent to UV radiation emitted by UV light source 24, thereby allowing radiation to travel through substrate 22 and cure the polymer composition for ribs 12. Alternatively, radiation curing may be achieved by other means, such as emitting radiation from a suitable radiation source 26, toward the nip between roll 18 and substrate 22. As another alternative, radiation can be emitted from a suitable radiation source 28 through intaglio roll 18. In this case, intaglio roll 18 must be transparent to radiation. The linear velocity of the nip of roll 18 relative to substrate 22 is adjusted to allow curing, with typical linear velocities ranging from about 0.1 mm/sec to about 10 m/sec.

An alternative method (shown in FIG. 2) for depositing curable polymer composition 12 and forming a rib pattern on substrate 22 involves coating a layer of curable polymer composition 12 from applicator roll 14 directly onto substrate 22 and employing the recessed surface 16 of intaglio roll 18 to emboss rib pattern structure 12 corresponding to the recess pattern 16. If needed or desired, the curable polymer composition may be heated prior to contact with roll 18, to impart sufficient flowability of the curable polymer composition. This may be achieved, by radiant heating, or by hot air blown onto the layer prior to being contacted by intaglio roll 18. The curable polymer composition 12 preferably is cured while under compression between the recessed or relief pattern 16 and substrate 22. As with the embodiment shown in FIG. 1, radiation curing of curable polymer composition of the embodiment shown in FIG. 2 can be achieved by emitting UV radiation from UV light source 24 through substrate 22 which is transparent to UV radiation, by UV light source 26 which directs UV radiation at the nip between roll 18 and substrate 22, or by UV light source 28 which directs UV radiation through UV transparent roll 18. The linear velocity of the nip of roll 18 relative to substrate 22 is adjusted to allow curing, with typical linear velocities ranging from about 0.1 mm/sec to about 10 m/sec.

To facilitate precise positioning of a light guide core material in an optical device, the substrate preferably has a smooth, level surface, and uniform thickness. This allows precise positioning or formation of rigid spacer ribs 12 and under-cladding onto substrate 22, and precise positioning of the core material on the under-cladding. Because of the availability and ease of manufacturing, silica based materials are preferred for substrate 22, with glass substrates being particularly preferred. However, polymer substrates may be used if desired.

Many of the polymeric materials used for forming the core and cladding of optical devices are highly halogenated. As a consequence, the adhesion between polymeric materials used for the cladding and core of optical devices with glass or silica substrates is poor. Accordingly, one of the functions of curable polymer composition for ribs 12 is to act as an adhesive layer for securing an under-cladding layer to substrate 22. The rib or spacer pattern 12 also assists in precise location of the core in the cladding by providing thickness control of the under-cladding layer. The rib pattern 12 is also useful for precise positioning and securing of the ends of optical fibers to the fabricated optical device. Suitable curable compositions for forming the rib or spacer pattern 12 on substrate 22 include various UV curable epoxy resins. The rib width can be selected for optimum compatability with the process chosen for applying the first cladding layer, and could serve as a support for doctor blade sizing of the cladding layer. The ribs can be of a suitable width for precision control of the rib height by the intaglio pattern depth. The intaglio depth controls the rib height, which in turn allows precise control of the thickness of the under-cladding layer, which in turn allows precise control of the position of the core relative to the substrate surface.

Substrate 22 defines a reference plane for subsequent precise positioning of cladding material and core material, and upper surfaces of the rigid ribs or spacers 12 fixed to the upper surface of the substrate, by either of the methods described above and shown in FIGS. 1 and 2, define a second plane which is parallel with and uniformly spaced above the reference plane. After the rigid spacers or ribs 12 have been fixed to substrate 22, a layer of a formable, curable under-cladding material is deposited over the upper surface of the substrate, generally between the ribs or spacers 12, with the upper surfaces of the rigid spacers providing a guide for precise control of the height of under-cladding material above the surface of the substrate 22. The under-cladding composition, such as a UV curable polymer composition, may be deposited into the recesses between the rigid spacers or ribs 12 from applicator roll 32 directly onto substrate 22 and ribs or spacers 12 as shown in FIG. 3. The level of under-cladding composition for under-cladding 30 can be controlled by doctor blade 34. The position of doctor blade 34, and therefore, the thickness of under-cladding layer 30 is precisely controlled by the spacer or rib height.

Cladding composition for layer 30 is cured under compression against a release surface which either has an intaglio depression which is pre-filled with the core composition, or a raised pattern for creating channels in the cladding which are subsequently filled with a core composition.

Figure 4:
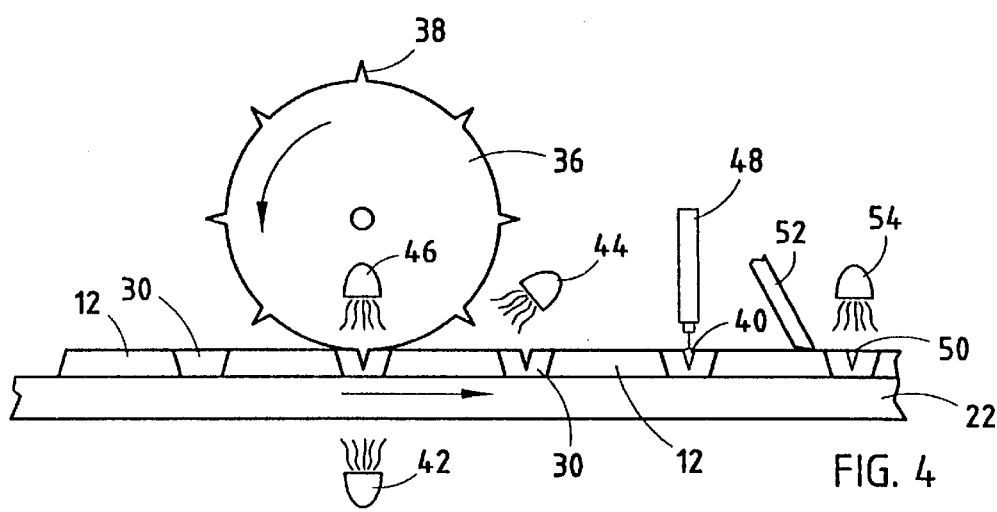
FIG. 4 is a side elevational view illustrating the apparatus and method for forming a channel pattern in the deposited under-cladding layer, and the subsequent deposition of core material into the channel pattern.

As shown in FIG. 4, forming roll 36 includes a raised pattern comprising triangular shaped ribs 38 which form channels 40 in under-cladding layer 30 for subsequent deposition of core material. Cladding 30 is desirably cured while under compression between embossing roller 36 and substrate 22. Curing of cladding 30 can be achieved by radiation emitted by UV light source 42 through substrate 22 and/or spacers or ribs 12, by UV light source 44 which directs UV radiation at the nip between roll 36 and substrate 22, or by UV light source 46 which emits radiation at under-cladding composition 30 through a UV transparent roll 36. The linear velocity of the nip of roll 36 relative to substrate 22 is adjusted to allow curing, with typical linear velocities ranging from about 0.1 mm/sec to about 10 m/sec.

After channels 40 have been formed by roll 36 and cured, such as by UV radiation from source 42, 44 or 46, a polymeric core composition is dispensed into channels 40 such as with inkjet printer 48. Alternatively, core composition can be dispensed into channel patterns 40 by doctoring, micropen dispensing, etc. Core composition deposited into channel pattern 40 can be leveled and excess material removed with doctor blade 52. The core material can be subsequently cured by directing UV radiation at the core composition from UV source 54.

Figure 5:
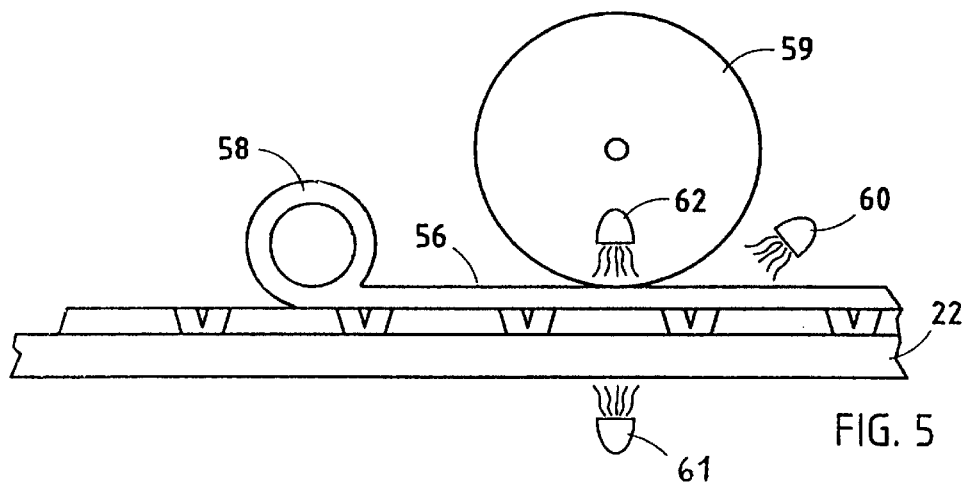
FIG. 5 is a side elevational view illustrating the apparatus and method for forming an over-cladding layer on the core material.

After the channel pattern has been formed and filled with core composition and core 50 has been cured, as described above and illustrated in FIG. 4, an over-cladding layer 56 may be deposited from an applicator roll 58 over core 50, and at least portions of ribs 12, and cladding 30, as shown in FIG. 5. Over-cladding layer 56 is desirably cured while under compression between compression roll 58 and substrate 22, such as by directing UV radiation through substrate 22, rib pattern 12, under-cladding 30, and core 50 from UV radiation source 61. Alternatively, over-cladding layer 56 may be cured by UV radiation directed at the nip between roll 58 and over-cladding layer 56 from UV source 60, or from UV source 62 through UV transparent roll 58. The linear velocity of the nip of roll 58 relative to substrate 22 is adjusted to allow curing, with typical linear velocities ranging from about 0.1 mm/sec to about 10 m/sec.

Figure 6:
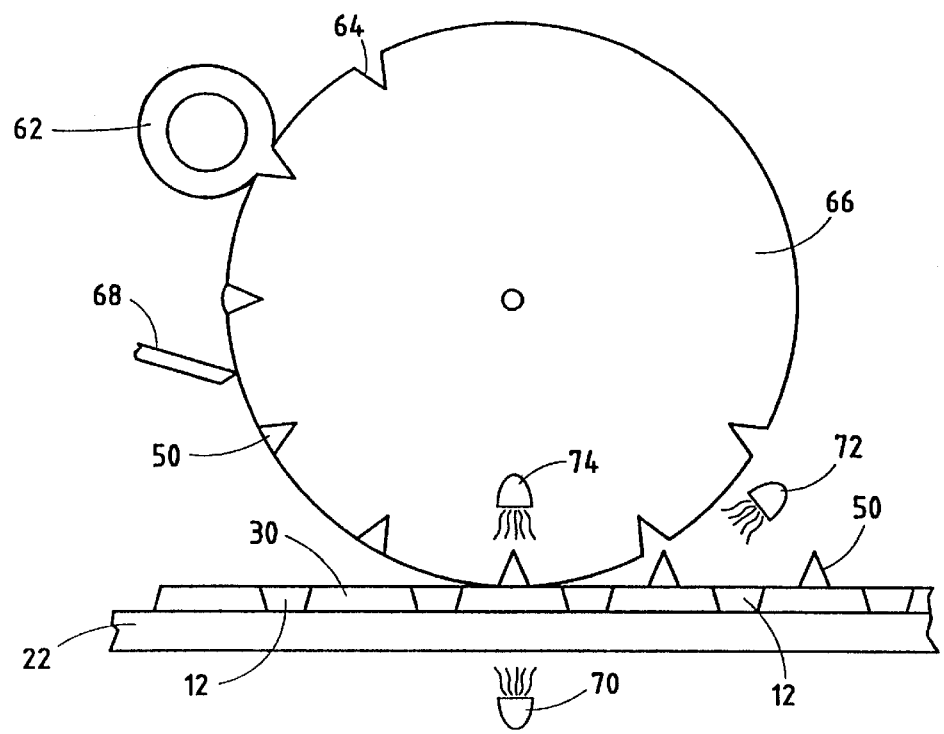
FIG. 6 is a side elevational view illustrating an alternative apparatus and method for depositing core material on the under-cladding layer.

An alternative technique for forming a core 50 of an optical device is shown in FIG. 6. In this embodiment, the core composition used to form core 50 is deposited from applicator roll 62 onto recessed surface 64 of intaglio roll 66. Alternatively, the core composition may be doctored into grooves 64. As other alternatives, the core composition can be deposited into groove 64 using inkjet printing, micropen dispensing, etc. Recessed pattern 64 corresponds to a desired core pattern for the optical device. After deposition into recess pattern 16, excess core composition may be removed from recesses 64 by doctor blade 68. The core composition desirably develops sufficient cohesiveness while retained within recessed pattern 64 to retain the shape of the recessed pattern 64. To facilitate this result, the core composition may be hardened during deposition to under-cladding 56. Desirably, the core composition and under-cladding composition are simultaneously cured and transferred to under-cladding 30, while the core material and under-cladding material are under compression between a release surface of intaglio roll 66 and substrate 22. Curing of the core composition and the under-cladding composition can be achieved by emitting UV radiation from UV radiation source 70 through substrate 22 at the under-cladding composition, and through the under-cladding composition to the core composition, by UV radiation emitted from UV source 72 and directed at the nip between intaglio roll 66 and substrate 22, or by UV radiation emitted from UV radiation source 74 through a UV radiation transparent roll 66 to the core composition and through the core composition to the under-cladding composition. The linear velocity of the nip of roll 66 relative to substrate 22 is adjusted to allow curing, with typical linear velocities ranging from about 0.1 mm/sec to about 10 m/sec.

Figure 7:
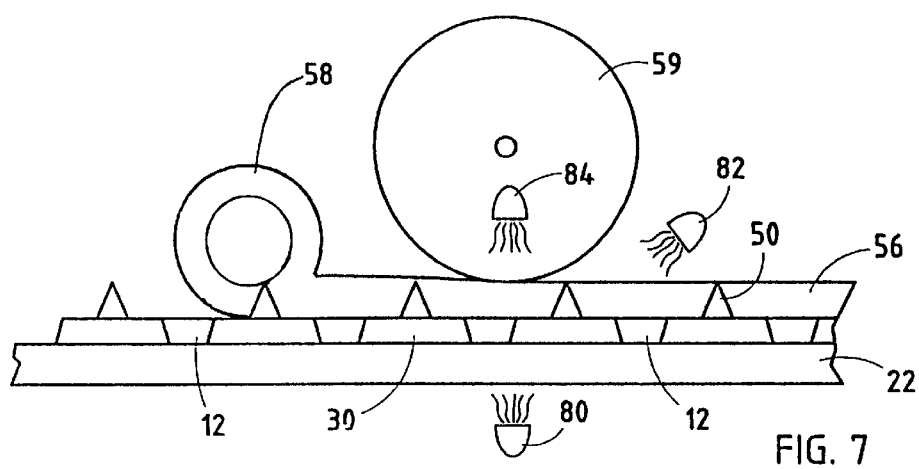
FIG. 7 is a side elevational view illustrating an alternative apparatus and method for depositing an over-cladding layer on the core material.
Figure 8:
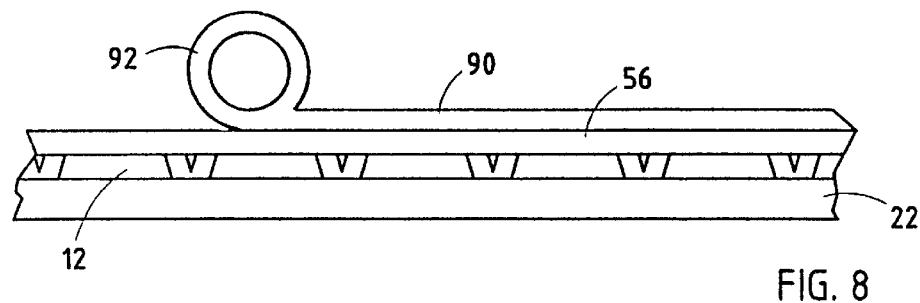
FIG. 8 is a side elevational view illustrating application of a protective overcoating layer.

After core 50 has been transferred to under-cladding 30 and cured, as described above and shown in FIG. 6, an over-cladding composition for forming layer 56 is deposited from applicator roll 58 over cured core pattern 50, and at least portions of rib or spacer pattern 12 and under-cladding 30, as shown in FIG. 7. Over-cladding layer 56 is desirably cured under compression between compression roll 59 and substrate 22 such as UV radiation emitted from UV radiation source 80 through substrate 22, and a combination of rib pattern 12, under-cladding 30 and core 50, by radiation directed at the nip between roll 59 and over-cladding layer 56 from radiation source 82, or by UV radiation emitted from radiation source 84 through UV radiation transparent roll 59. The linear velocity of the nip of roll 59 relative to substrate 22 is adjusted to allow curing, with typical linear velocities ranging from about 0.1 mm/sec to about 10 m/sec.

The under-cladding composition, the over-cladding composition, and the core composition are flowable, formable materials, desirably radiation curable polymer compositions. The curable polymer compositions used for the cladding and core are optically transmissive polymers which may be selected from those known in the art. Suitable optically transmissive polymers which may be used to form the cladding and core include halogenated and deuterated siloxanes, acrylates and methacrylates such as ethylene glycol dimethacrylate, tetrafluoropropylmethacrylate, pentafluorophenylmethacrylate, tetrachloroethylacrylate, multifunctional derivatives of triazine and phosphazene. Resins and polymers that contain highly fluorinated aliphatic and aromatic moieties, particularly those capable of being formed into cross-linked or covalent networks, are preferred. The core polymer may have a refractive index from about 1.4 to about 1.7, for example from about 1.43 to about 1.5, and particularly from about 1.45 to about 1.46 at the wavelength of light used in the optical device. When the light guide core in the optical device is coupled to an end of an optical fiber, the core polymer preferably has a refractive index which closely matches that of the optical fiber. The under-cladding and over-cladding preferably have a refractive index which is from about 0.001 to about 0.02, preferably from about 0.002 to about 0.01, and particularly from about 0.004 to about 0.007, less than the refractive index of the core. The over-cladding layer and the under-cladding layer may be the same or different.

In order to facilitate curing of the over-cladding composition, under-cladding composition, and core composition, it is preferred to use a photoinitiator, particularly a UV photoinitiator. Typically, when used, a photoinitiator is present in the resin at a concentration of from about 0.1 to about 3% by weight, and more particularly from about 0.5 to about 2% by weight. Suitable UV photoinitiators include 2-methyl-1-[4-(methylthio)phenyl]-2-morpholino propanone-1(Irgacure 907), 1-hydroxy-cyclohexylphenyl ketone(Irgacure 184), isopropylthioxanthone(Quantacure ITX), and amphorquinone/ dimethylaminoethylmethacrylate.

Substrate 22 is sufficiently thick so that it is relatively rigid and durable. A suitable thickness for a glass substrate 22 is, for example, from about 0.5 millimeters to about 5 millimeters. The height of the rib pattern 12, and hence the thickness of the under-cladding layer is typically from about 1 micrometer to about 20 micrometers. The width of the individual ribs of the rib pattern are typically from 5 micrometers to several hundred micrometers. The height of the core 50 is typically from about 1 to about 10 micrometers. The thickness of the over-cladding layer is typically from about 1 to about 20 micrometers. The ribs of the rib structure are preferably rectangular or trapezoidal in cross section, with the upper surface of the ribs being generally flat and having a width of at least about 5 micrometers. The channels of the channel pattern used to form the core, and hence the core, are preferably triangular in cross section.

For either of the resulting optical devices shown in FIGS. 5 and 7, a protective overcoating layer 90 may be deposited from applicator roll 92 directly onto over-cladding 56. Protective overcoating layer 90 may be, for example, a polymeric overcoating layer which protects the optical polymers (i.e., the cladding and core) from radiation and/or physical damage. The protective overcoat may be a thermoset resin or a thermoplastic resin. In the case of a thermoset resin, the overcoating material 90 is cured, such as with the aid of a thermal initiator or a photoinitiator. A thermoplastic overcoating layer 90 may be separately formed and laminated to under-cladding layer 56, such as with an adhesive.

Figure 2:
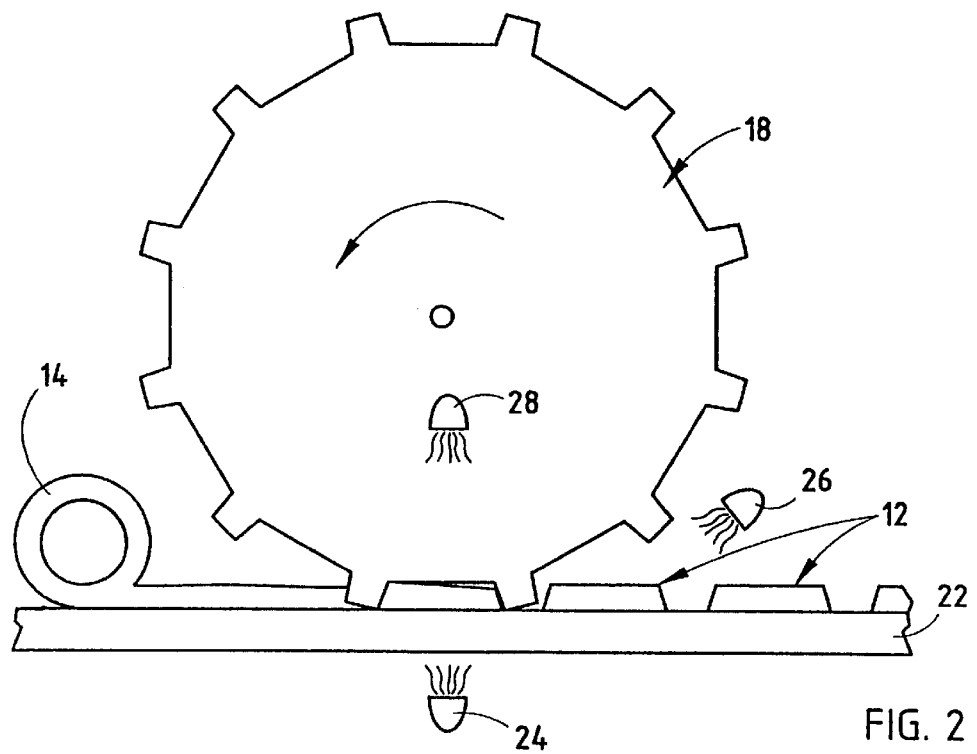
FIG. 2 is a schematic side elevational view illustrating an alternative method and apparatus for forming a pattern of rigid ribs or spacers on the substrate.
Figure 3:
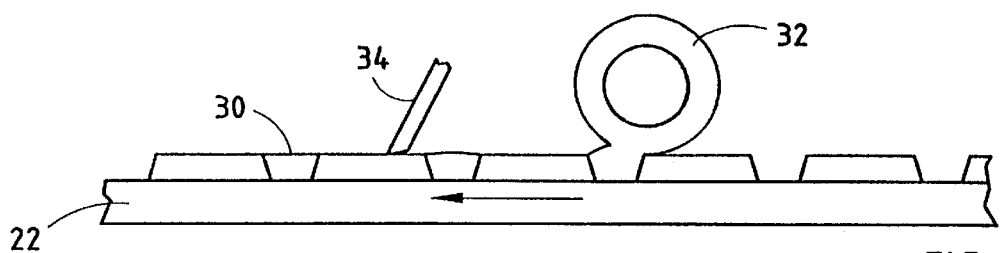
FIG. 3 is a side elevational view illustrating the apparatus and method for applying under-cladding material into spaces defined between the rigid ribs or spacers on the substrate.

The intaglio rolls 18, 36, 66 used for embossing and/or forming and transferring polymeric material include a relief or patterned surface having a release coating or surface which allows materials to be transferred from recesses in the rollers to substrate 22 and/or onto cladding 30, and/or includes projections for creating a rib pattern, such as shown in FIG. 2, or for creating a channel pattern, such as shown in FIG. 4. The relief surface of the intaglio rolls may be formed, for example, from a material of moderate release, such as Halar, Tedlar, Tefzel, polyethylene, etc. Alternatively, it may be comprised of one of a number of materials noted for high release, such as silicones or fluorocarbons. In the case of a transfer process (such as shown in FIG. 6) wherein a polymeric material is deposited within recesses on an intaglio roll and subsequently transferred to a substrate surface, such as under-cladding 30 as shown in FIG. 6, the desire is to make the adhesion between the polymeric material which is being transferred and the patterned release surface less than between the polymeric material being transferred and the substrate surface on which the polymeric material is being transferred. In those cases where the intaglio plate includes projections for embossing a deposited polymeric layer, such as shown in FIG. 4, the desire is to make the adhesion between the deposited polymer which is being embossed and the patterned release surface of the intaglio roll less than the cohesive strength of the polymeric material which is being embossed. The intaglio image can be formed using many techniques, such as manufacturing the intaglio surface from one of the above mentioned materials or by coating one of the above mentioned materials onto a relief surface. One example is embossing by heating one of the above materials at a temperature above the flow point of the polymer and applying the material under pressure against a rigid master mold pattern. The intaglio surface could alternatively be etched metal or foil, such as nickel, or an etched sheet of glass on which a release coat is applied. The embossed polymer layer is preferably backed with an elastomeric material to impart compressibility. As an alternative, intaglio plates may be used in place of the intaglio rolls.

Figure 9:
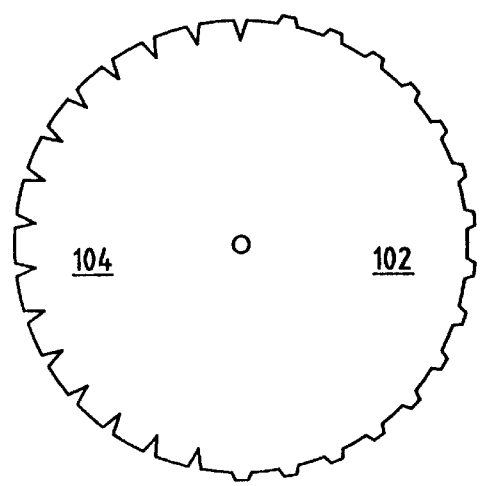
FIG. 9 is a side elevational view of an intaglio roll having a first section for forming the rigid spacers or ribs, and a second section for forming and depositing the core material in a predetermined pattern on the under-cladding.
Figure 10:
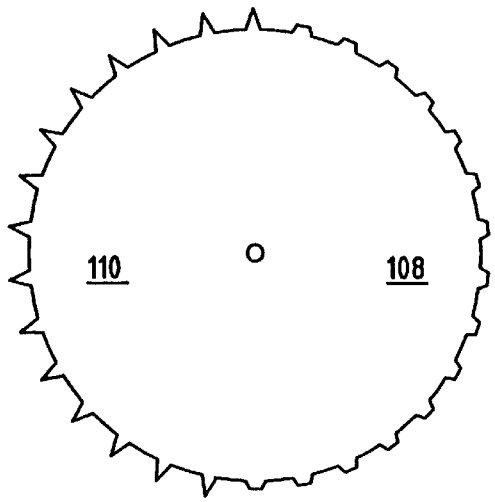
FIG. 10 is a side elevational view of an alternative intaglio roll including a first section for forming the rigid spacer or rib pattern on the substrate, and a second section for forming a channel pattern in the under-cladding layer.
Figure 11:
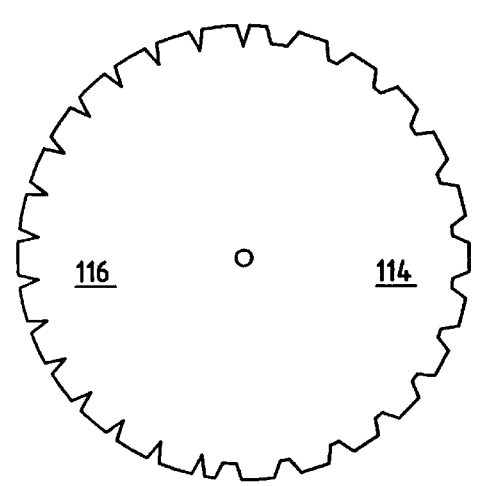
FIG. 11 is a side elevational view of another alternative intaglio roll having a first section for forming and depositing a rigid spacer or rib pattern on the substrate, and a second section including a recessed pattern for forming and depositing core material in a predetermined pattern on the under-cladding layer.
Figure 12:
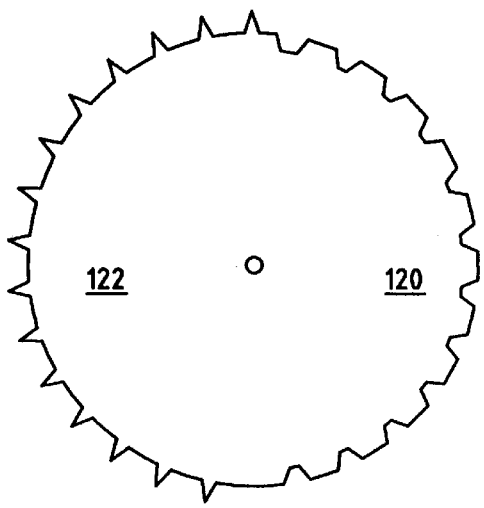
FIG. 12 is a side elevational view of yet another alternative intaglio roll including a first section for forming and depositing a rigid spacer pattern on the upper surface of the substrate, and a second section for forming a channel pattern in the under-cladding for subsequent deposition of core material.

It is desirable that the rib embossing pattern used to form the rib or spacer pattern (as shown in FIG. 2) or the intaglio recesses used to transfer the curable polymer composition for the ribs to substrate 22 (as shown in FIG. 1), and either the intaglio pattern for embossing a channel pattern 50 into under-cladding 30 (such as shown in FIG. 4) or for depositing the composition for core 50 (as shown in FIG. 6), be located in different areas of the same forming tool, which may be an intaglio roll or an intaglio plate. An example is shown in FIG. 9, in which intaglio roll 100 includes a section having an embossing portion 102 for embossing a rib pattern in the curable polymer composition for ribs 12 (as shown in FIG. 2), and a portion 104 for depositing material for core 50 (such as shown in FIG. 6). FIG. 10 shows an intaglio roll 106 including a portion 108 having a projecting rib pattern for embossing curable polymer composition for ribs 12 as shown in FIG. 2, and a portion 110 with a projecting pattern for embossing channel pattern 40 (such as shown in FIG. 4). FIG. 11 shows an intaglio roll 112 including a portion 114 having a recessed pattern for depositing curable polymer composition for ribs 12 on substrate 22 (as shown in FIG. 1), and a portion 16 for depositing material for core 50 on cladding composition 30 (such as shown in FIG. 6). FIG. 12 shows an intaglio roll 118 including a portion 120 having a recessed pattern for depositing curable polymer composition for ribs 12 onto substrate 22 (such as shown in FIG. 1), and a portion 122 having a raised embossing pattern for forming a channel pattern in under-cladding 30 (such as shown in FIG. 4). By incorporating two different patterns into the same tool, precision alignment between the patterns is ensured. In an example case, the tool can be a nickel foil with a relief pattern which is created by a technique such as photolithography. The foil tool may be attached to a roll (such as shown in FIGS. 9–12) or to a plate (not shown) wherein the tool is aligned to the axis of lateral movement relative to the substrate. The pattern area of contact with the tool during the compression steps is selected depending on whether the ribs or channel pattern for the core is being formed.

The curable polymer composition used to form the rib or spacer pattern 12 is desirably pigmented to provide an easy reference for guide location in any subsequent alignment step during device construction.

Although it is preferable to form the rib pattern with the same tool as is used to form a channel for the core material, it is possible to pre-mold or otherwise form the ribs into the substrate. It is also possible to use spacer beads instead of ribs for precision gap control. However, this technique for gap control (i.e., controlling the thicknesses of the various layers) is more applicable to the second applied cladding layer (the over-cladding layer) or the protective overcoating layer 90.

Preferably, the rib pattern includes feature(s) for forming channel(s) for fiber location for connecting the end of optical fiber(s) to the optical device being fabricated.

In addition to the intaglio rollers and intaglio plates mentioned hereinabove, it is also conceivable that the relief surfaces for forming the spacer rib pattern and the core channel pattern can be formed on a continuous belt which increases the contact area with the substrate as compared with the intaglio roll option. A continuous belt of this type could be made of nickel foil. A belt of this type could be looped around two rollers and a platen which holds the intaglio belt firmly against the material which is being embossed by the intaglio belt or onto which material is being deposited from the intaglio belt.

FIGS. 1–8 are intended to illustrate and promote understanding of the methods of this invention only, and are not intended to illustrate fabrication of any particular type of optical device or devices. However, it is envisioned that the methods described above and illustrated in FIGS. 1–8 can be used for making a plurality of devices concurrently, and thereafter the resulting fabricated structure can be cut or otherwise divided into a plurality of separate devices.

Figure 13:
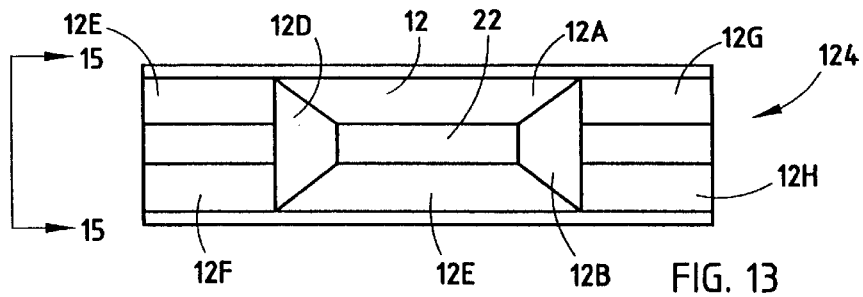
FIG. 13 is a top plan view of a substrate for an optical device with a rigid spacer pattern formed on the upper surface thereof.
Figure 14:
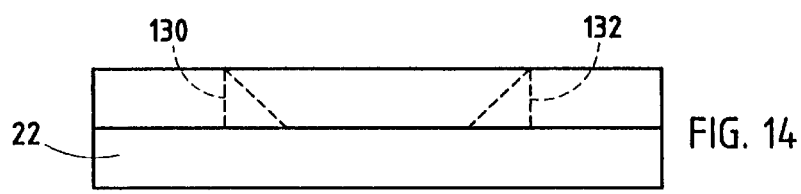
FIG. 14 is a side elevational view of the article shown in FIG. 13.
Figure 15:
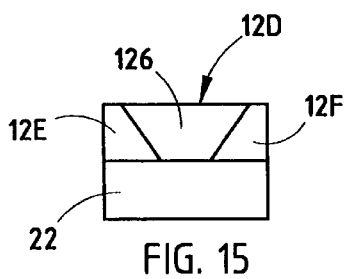
FIG. 15 is an end elevational view of the article shown in FIG. 13.
Figure 16:
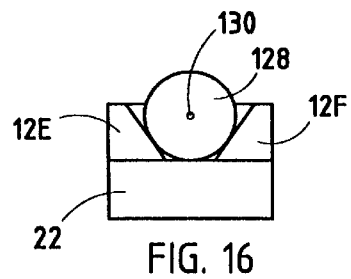
FIG. 16 is an end elevational view of the article shown in FIG. 13, with an optical fiber positioned on the rigid rib or spacer pattern.
Figure 17:
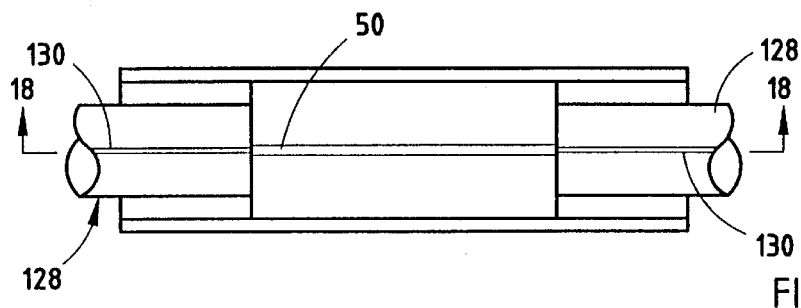
FIG. 17 is a cross-sectional plan view of an optical coupling device constructed in accordance with the present invention.
Figure 18:
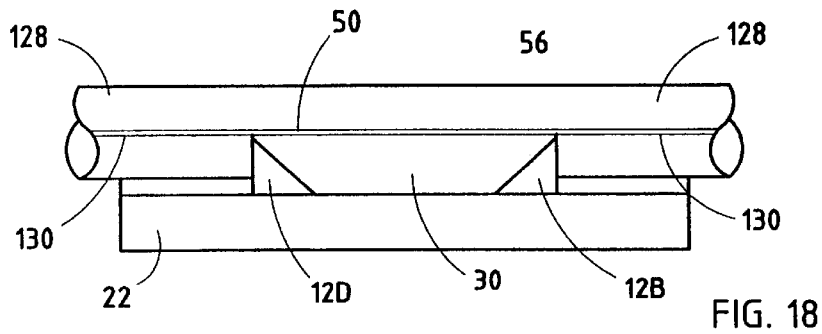
FIG. 18 is a cross-sectional view of the device shown in FIG. 17 taken along section line 18—18.
Figure 19:
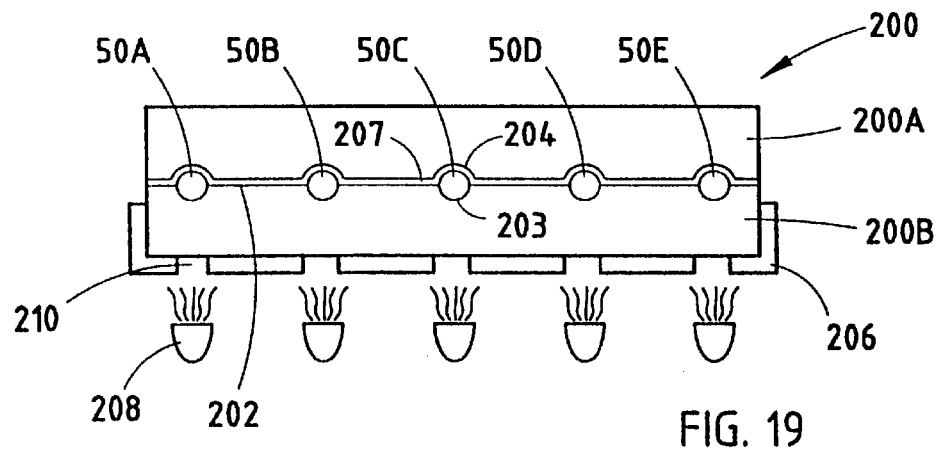
FIG. 19 is a side elevational view illustrating an alternative apparatus and method for molding a light guide core in accordance with the present invention.

A single, relatively simple optical coupling device 124, such as for joining two glass optical fibers, is shown at an intermediate stage of production in FIGS. 13–16, and completed in FIGS. 17 and 18. In FIGS. 13–15, the optical coupling device 124 is shown at an intermediate stage of production after the rigid rib or spacer pattern has been formed on substrate 22, but before any cladding composition or core composition has been deposited thereon. Rib structure 12 includes sections 12A, 12B, 12C, and 12D, each of which have a triangular transverse cross-sectional shape, and which together with substrate 22 define an inverted, truncated pyramid shaped reservoir. Rib pattern 12 also includes sections 12E, 12F, 12G and 12H. as shown in FIG. 15, rib pattern sections 12E and 12F define a notch 126 which allows precise positioning of an optical fiber 128 to the optical device 124 so that the light guide core 130 of optical fibers 128 are in alignment as shown in FIGS. 17 and 18. FIGS. 17 and 18 are cross-sectional views representing the completed device 124 with core 50 located between under-cladding 30 and over-cladding 56, and with an end of each of optical fibers 128 embedded within over-cladding 56. This can be achieved by positioning optical fibers 128 in notch 126 with the end of each of optical fibers 128 abutting the outwardly facing walls 130, 132 of rib sections 12D and 12B respectively, and thereafter, forming core 50 and over-cladding 56 generally in accordance with the methods described above and shown in FIGS. 1–8, by applying sufficient over-cladding to fill gaps between rib portions 12E, 12F and fiber 128 to secure fiber 128 to device 124 with core 130 precisely aligned with core 50.

In accordance with an alternative technique, a rigid rib or spacer pattern is formed on a substrate, under-cladding material is deposited on the substrate in space defined between the ribs of the rib structure, and a channel pattern is embossed into the under-cladding, generally in accordance with a method described above and illustrated in FIG. 4. However, the core and over-cladding are formed in accordance with an alternative technique in which the core material is shaped and cured in a closed mold, transferred onto a roll coated with a layer of over-cladding composition, and the resulting over-cladding coating containing an embedded core pattern is transferred to the structure (comprising a substrate, a rib pattern, and an under-cladding) which is similar to the structure formed in FIG. 4, except that the V-shaped channels 40 are replaced with channels which conform with the molded core material, e.g., a semicircular channel, as shown in FIG. 22. The alternative technique will be described with reference to FIGS. 19–23. The light guide core pattern 50 is formed in a closed mold 200 defined by mating mold parts 200A and 200B. Molds parts 200A and 200B have planar mating surfaces defined along the interface 202 between mold parts 200A and 200B. Mold parts 200A and 200B also have mold cavity defining surfaces 203, 204 which together define a mold cavity. At least one, and preferably both, of the mold cavity defining surfaces are recessed into the planar mating surfaces defined along interface 202. For example, in the illustrated embodiment, each of the mold halves include recessed mold cavity defining surfaces which define a light guide core pattern in which the individual light guides 50A, 50B, 50C, 50D and 50E are circular in cross section, and each of the mold cavity defining surfaces is semicircular in cross section. Mold part 200B includes a light-blocking mask 206 which covers the outer faces of mold part 200B except in the areas adjacent the mold cavities. Mold part 200B is made of a material which is transparent to UV radiation. A suitable material for fabricating mold part 200B is fused silica. Although it is only essential that mold part 200B be transparent to UV radiation, it is preferable that both mold parts 200B and 200A be fabricated of the same material to facilitate precise alignment due to identical coefficients of thermal expansion. The mold face of mold part 200A can optionally have a light-blocking mask 207 across the entire mold face including the mold cavity defining surfaces. Both mold faces must be coated with a release coating to prevent adhesion to the materials intended to be molded therein. Desirably, the mating surfaces of mold parts 200A, 200B are provided with release coatings of different surface energy such that there is a release differential between opposing faces. This causes the molded light guide cores 50A, 50B, 50C, 50D and 50E to be retained on a selected mold part 200A or 200B when mold 200 is open. The light guide core pattern is prepared by closing the mold 200 and introducing material into the mold cavities defined therein. On closure of the mold, light curable core material may be introduced into the mold cavities by injecting material under pressure into the cavities. Alternatively, material for core pattern 50 can be drawn into the cavities by capillary action or by drawing a vacuum on the mold cavity. Another option is to deposit sufficient material in the channels on one mold face by microdispensing, inkjet printing or other means, such that the channel is filled without air entrapment upon closure. This requires a large positive meniscus, and an ability to vent the air between the opposing mold faces. The material is then cured by UV radiation emitted from UV radiation source 208 through openings 210 in mask 206. The position of openings 210 and UV radiation source 208 with respect to mold cavity defining surfaces 203 and 204 is such that any flash remains uncured.

At the ends of the light guide cores, fiber can be inserted into the mold cavity for direct molding to the fiber, or the mold can be constructed so that the face on which the guide is to remain has a replicate of the fiber as part of the mold face.

Figure 20:
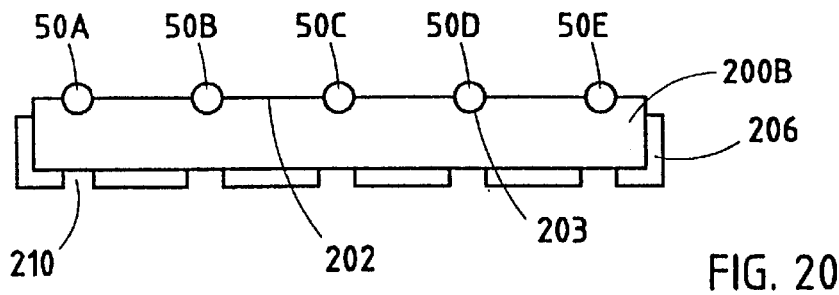
FIG. 20 illustrates the molding apparatus of FIG. 19 with an upper mold half of the apparatus removed.
Figure 21:
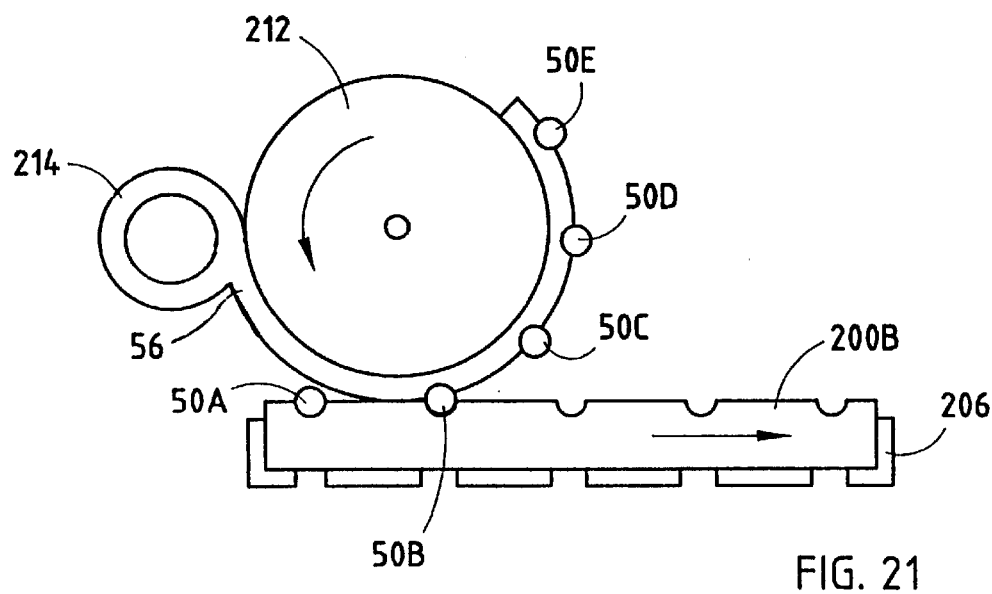
FIG. 21 is a side elevational view illustrating the apparatus and method for forming an over-cladding layer and depositing the light guide core material on the over-cladding.
Figure 22:
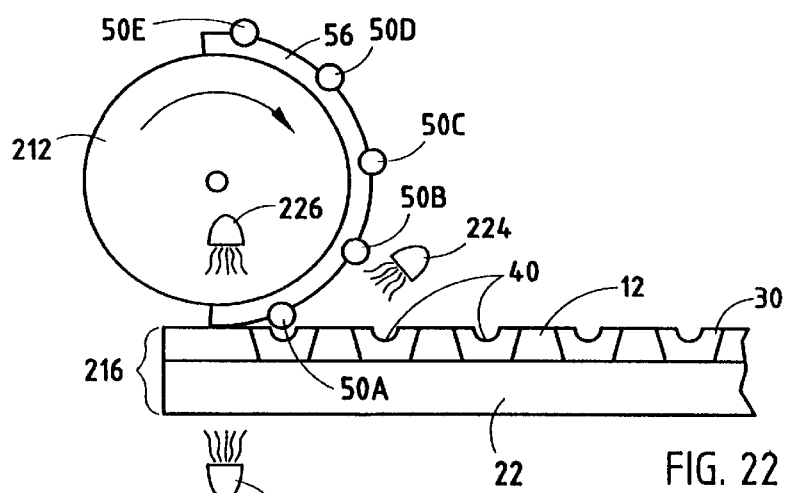
FIG. 22 is a side elevational view illustrating the apparatus and method for depositing the light guide core and over-cladding onto an under-cladding layer formed on a substrate.
Figure 23:
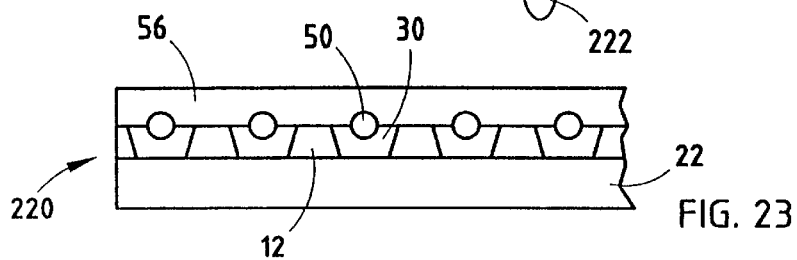
FIG. 23 is a side elevational view of an optical device formed by the method shown in FIGS. 19–22.

After the core material has been cured, the mold is opened (as shown in FIG. 20), and thereafter a roll 212, which is coated with an over-cladding composition applied by applicator roll 214, contacts the mold face retaining cured light guide cores 50A–50E (as shown in FIG. 21). Thereafter, the over-cladding material with light guide cores 50A–50E adhered thereto are transferred together from roll 212 to an article 216 comprising substrate 22, rib pattern 12, and under-cladding 30 having a channel pattern 40 embossed therein, with the individual channels of the channel pattern having a semicircular cross section to accommodate the circular cross section of light guide cores 50A–50E. Composite 216 can be prepared in the manner described above with reference to FIG. 4. As over-cladding 56 and cores 50A–50E are transferred to composite 216, over-cladding 56 may be cured while under compression between roller 212 and composite 216. Curing can be achieved such as with ultraviolet radiation from radiation source 222, 224 or 226, such as in a manner similar to that described above with respect to FIG. 7. The resulting optical device 220 is shown in FIG. 23.

Figure 24:
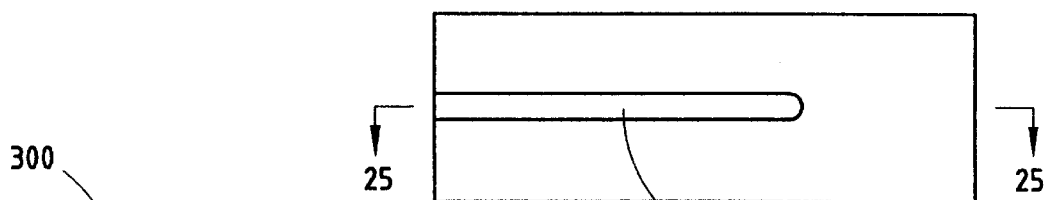
FIG. 24 is an elevational, cross-sectional view of an optical splitter device constructed in accordance with the present invention.
Figure 25:
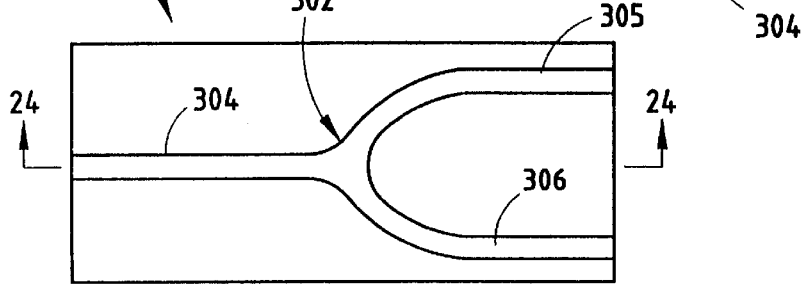
FIG. 25 is a cross-sectional view of the optical splitter device of FIG. 24 taken along section line 25—25.

Although certain details have been described with respect to the relatively simple optical coupling device shown in FIGS. 17 and 18, it should be understood that the principles of this invention can be applied to the fabrication of various optical devices of greater complexity, such as an optical device 300 (shown in FIGS. 24 and 25) light guide core 302 having a Y-junction or splitter in which light is directed along stem 304 and is split between two branches 305, 306. Other optical devices which can be fabricated in accordance with the methods of this invention include devices for polarization control, distribution, combining, multiplexing and demultiplexing of a light signal. Active optical devices may also be fabricated using the methods of this invention.

Figure 26:
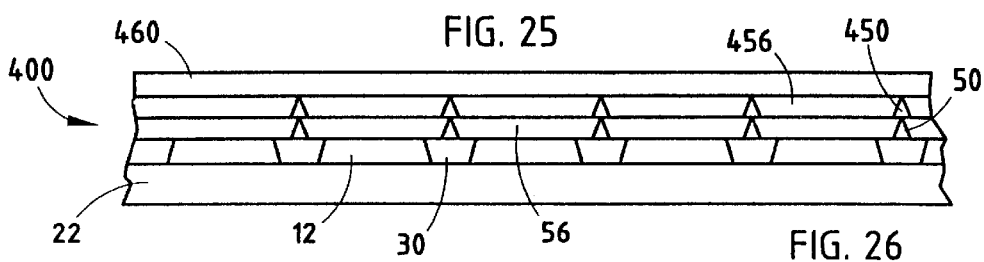
FIG. 26 is an end view of a multiple layer optical device in accordance with the present invention.

The methods of this invention may also be used for fabricating complex multiple layer optical devices. A multiple layer optical device 400 is shown in FIG. 26. The device includes a substrate 22, a rigid rib pattern 12, under-cladding 30, core pattern 50, and cladding 56. Cladding 56 and core pattern 50, together define a first optical layer of multiple layer optical device 400. The first layer can be formed over a rib pattern 12 and substrate 22 which is prepared in accordance with any of the techniques described above. A second optical layer comprising core pattern 450 and over-cladding 456 can be prepared using any of the techniques useful for preparing the first optical layer. Additional optical layers can be added as desired. Optionally, multiple layer optical device 400 can be provided with a protective overcoat 460. Generally, the method of preparing a multiple layer optical device involves the steps of: providing a substrate; fixing rigid spacers to an upper surface of the substrate, the spacers having upper surfaces spaced above the substrate; depositing a layer of a formable, curable under-cladding material over the upper surface of the substrate, the upper surface of the rigid spacers providing a guide for control of the height of the under-cladding material above the surface of the substrate; curing the under-cladding material under compression to form an under-cladding layer; depositing a first light guide core and a first over-cladding on the under-cladding to form a first optical layer; and thereafter depositing at least a second light guide core and at least a second over-cladding on the first optical layer to form a second optical layer.

It will be apparent to those skilled in the art that various modifications and adaptations can be made to the present invention without departing from the spirit and scope of this invention. Thus, it is intended that the present invention cover the modifications and adaptations of this invention, provided they come within the scope of the appended claims and their equivalents.

What is claimed is:

1. A method of making an optical device for transmission and/or processing of light signals, comprising:

provided a substrate having an upper surface which defines a reference plane for subsequent positioning of cladding material and core material;

affixing spacers to the upper surface of the substrate, the spacers having upper surfaces which define a second plane spaced above the reference plane;

depositing a layer of a formable, curable under-cladding material over the upper surface of the substrate, the upper surfaces of the spacers providing a guide for control of the height of the under-cladding material above the surface of the substrate;

curing the under-cladding material under compression to form an under-cladding layer;

depositing a light guide core and over-cladding on the under-cladding.

2. The method of claim 1 wherein the spacers are formed in a pattern of rigid ribs of uniform thickness.

3. The method of claim 2 wherein the pattern of rigid ribs of uniform thickness is affixed to the upper surface of the substrate by coating the substrate with a formable, curable polymer composition, creating channels in the curable polymer composition, and curing the curable polymer composition.

4. The method of claim 3 wherein the channels in the curable polymer composition are created by compressing the curable polymer composition between the substrate and a release surface having a relief pattern which defines the pattern of ribs, and curing the curable polymer composition while under compression between the release surface and the substrate.

5. The method of claim 4 wherein the release surface having a relief pattern which defines the pattern of rigid ribs formed on the upper surface of the substrate further includes at least one relief feature which forms a groove in at least one of the ribs for receiving and precisely positioning an end of an optical fiber in proximity to the core.

6. The method of claim 2 wherein the pattern of rigid ribs of uniform thickness is affixed to the upper surface of the substrate by coating a release surface having a relief pattern which defines the pattern of ribs with a formable, curable polymer composition, the coating filling depressions in the release surface which define the rib pattern, transferring the curable polymer composition coated on the release surface to the upper surface of the substrate, and curing the curable polymer composition during transfer of the curable composition to the upper surface of the substrate while the curable composition is under compression between the substrate and the release surface.

7. A method of making an optical device for transmission and/or processing of light signals, comprising:

providing a substrate having an upper surface which defines a reference plane for subsequent positioning of cladding material and core material;

affixing spacers to the upper surface of the substrate, the spacers having upper surfaces which define a second plane spaced above the reference plane;

depositing a layer of a formable, curable under-cladding material over the upper surface of the substrate, the upper surfaces of the spacers providing a guide for control of the height of the under-cladding material above the surface of the substrate;

curing the under-cladding material under compression to form an under-cladding layer;

applying a formable, curable core material onto the under-cladding layer;

maintaining the core material in a predetermined pattern while curing the core material to form a light guide core for transmission and/or processing of light signals, the core has an index of refraction which is greater than the index of refraction of the under-cladding;applying a layer of a formable, curable over-cladding polymeric material over the light guide core and under-cladding layer; and curing the over-cladding material to form an over-cladding layer.

8. The method of claim 7 wherein the under-cladding material is cured under compression between the substrate and a release surface of a forming tool, the release surface including projecting ridges which form a channel pattern in an upper surface of the under-cladding material as the under-cladding material is cured under compression between the substrate and the release surface, and wherein the core material is deposited into the channel pattern and cured in the channel pattern to form the core.

9. The method of claim 7 in which the core material is deposited on the upper surface of the substrate by filling depressions in a release surface defining the predetermined pattern of the core with the formable, curable core material, transferring the core material to an upper surface of the under-cladding, and curing the core material and the under-cladding while the core material is under compression between the release surface and the substrate.

10. The method of claim 7 wherein the core material is deposited on the upper surface of the substrate by filling depressions in a release surface defining the predetermined pattern of the core, transferring the core material to the upper surface of the cladding, and curing the core material while the core material is under compression between the under-cladding and the release surface, and wherein the release surface having a relief pattern which defines the pattern of ribs and the release surface which includes projecting ridges are mounted on different areas of a single forming tool.

11. The method of claim 7 wherein the under-cladding material is cured under compression between the substrate and a release surface mounted on a forming tool, the release surface including projecting ridges which form a channel pattern in an upper surface on the under-cladding material when the under-cladding material is cured under compression between the substrate and the release surface, and wherein the core material is deposited into the channel pattern and cured in the channel pattern to form the core; and wherein the release surface having a relief pattern which defines the pattern of ribs and the release surface including projecting ridges which form a channel pattern in the upper surface of the under-cladding material are mounted on different areas of a single forming tool.

12. The method of claim 1 wherein the step of depositing a light guide core and over-cladding on the under-cladding includes the steps of forming a light guide core in a closed mold, opening the mold, transferring the light guide core onto a roll coated with a layer of over-cladding composition, and transferring the resulting over-cladding coating and the light guide core onto the under-cladding layer.

13. A method for making a multiple layer optical device for transmission and/or processing of light signals, comprising:

providing a substrate which defines a reference plane for subsequent positioning of cladding material and core material;

depositing a layer of a formable, curable under-cladding material over the upper surface of the substrate;

depositing a first light guide core and a first over-cladding on the under-cladding to form a first optical layer; and depositing a second light guide core onto the first over-cladding and a second over-cladding onto the first over-cladding to form a second optical layer.

14. An optical device comprising:

a substrate;

a pattern of spacers affixed to an upper surface of the substrate;

a polymeric under-cladding layer positioned over the substrate in space defined between the spacers;

a polymeric light guide core positioned over the under-cladding layer; and a polymeric over-cladding layer positioned over the light guide core and at least a portion of the under-cladding.

15. A method of forming a light guide core for an optical device for transmission and/or manipulation of light, and depositing the light guide core on a polymeric under-cladding layer deposited on a substrate comprising:

filling depressions in a release surface defining the predetermined pattern of the core, with a formable, curable core material;

transferring the core material to an upper surface of the polymeric under-cladding layer; and curing the core material while the core material is under compression between the release surface and the substrate.

16. An apparatus for forming a light guide core for an optical device for transmission and/or manipulation of light, and depositing the light guide core on a polymeric under-cladding layer deposited on a substrate, comprising:

a tool having a release surface defining a recessed pattern which defines a pattern for the light guide core.

17. An optical component comprising:

a substrate;

a reference pattern of spacers formed on the substrate, the spacers having a height;

a first cladding on the substrate between the spacers, the first cladding completely filling a volume defined by the substrate and adjacent spacers to the height of the spacers;

an optical guide core over the first cladding; and a second cladding over the optical guide core to sandwich the optical guide core between the first and second claddings.

18. A multiple layer optical component comprising:

a substrate;

a reference pattern of spacers formed on the substrate;

a first cladding on the substrate between the spacers;

a first optical guide core on the first cladding;

a second cladding over the first optical guide core to sandwich the optical guide core between the first cladding and the second cladding;

a second optical guide core on the second cladding; and a third cladding over the second optical guide core to sandwich the second optical guide core between the second cladding and third cladding.

* * * * *

UNITED STATES PATENT AND TRADEMARK OFFICE
CERTIFICATE OF CORRECTION

PATENT NO.    : 6,272,275 B1
DATED         : August 7, 2001
INVENTOR(S)   : Cortright et al.

It is certified that error appears in the above-identified patent and that said Letters Patent is hereby corrected as shown below:

<u>Title page, Item 54 and Column 1, line 1,</u>
Delete "FOR" first occurrence.

<u>Column 4,</u>
Line 36, "preferable" should be -- preferably --.

<u>Column 7,</u>
Line 29, after "such as" insert -- by --.
Line 29, "as" should be -- As --.

<u>Column 10,</u>
Line 67, "Molds" should be -- Mold --.

Signed and Sealed this

Ninth Day of July, 2002

*Attest:*

JAMES E. ROGAN
*Director of the United States Patent and Trademark Office*

*Attesting Officer*